United States Patent [19]

Dimler et al.

[11] Patent Number: 5,378,488
[45] Date of Patent: Jan. 3, 1995

[54] ASEPTIC PROCESSING OF INFANT FORMULA

[75] Inventors: Steven R. Dimler, Bexley; David V. Diodato, Waverly; Terrence B. Mazer, Reynoldsburg; Daniel L. McKamy, Gahanna; James M. Simpson, Whitehall, all of Ohio

[73] Assignee: Abbott Laboratories, Abbott Park, Ill.

[21] Appl. No.: 75,191

[22] Filed: Jun. 10, 1993

[51] Int. Cl.$^6$ .................................... A23C 3/00
[52] U.S. Cl. ........................ 426/580; 426/324; 426/330.2; 426/334; 426/399; 426/522; 426/585
[58] Field of Search ............... 426/271, 321, 324, 330, 426/330.2, 334, 580, 585, 587, 588, 399, 520, 521, 522

[56] References Cited

U.S. PATENT DOCUMENTS

| | | | |
|---|---|---|---|
| 3,901,979 | 8/1975 | Nagasawa et al. | 426/613 |
| 4,303,692 | 12/1981 | Gaull | 426/580 |
| 4,840,814 | 6/1989 | Harada et al. | 426/580 |
| 5,007,232 | 4/1991 | Caudill | 53/426 |
| 5,039,532 | 8/1991 | Jost et al. | 426/41 |

OTHER PUBLICATIONS

Augustin et al., "Effects of added salts on the heat stability of recombined concentrated milk", Journal of Dairy Research, (1990), 57, 213-226.
Burton, "Deposits from Whole Milk in Heat Treatment Plant" J. Dairy Research, vol. 35, pp. 317-330, 1968.
Skudder et al., "Effect of pH on the Formation of Deposits from Milk on Heated Surfaces During Ultra High Temperature Processing," J. Dairy Research, vol. 53, pp. 75-87, 1985.
Patil et al., "Effect of pH of Milk in Directly and Indirectly Heated Plants", Milchwissenschaft, vol. 43, pp. 360-362, 1988.
Burdett, "The Effect of Phosphates in Lowering the Amount of Deposit Formation During the Heat Treatment in Milk", J. Dairy Research, vol. 41, pp. 123-129, 1974.
Joshi et al., "Heat-induced Deposit Formation & its Relationship to Heat Stability in a Blend of Recombined and Fresh Milk" J. Dairy Res., vol. 53, pp. 323-328, 1986.
M. Britten et al., "Deposit Formation on Heated Surfaces: Effect of Interface Energetics", J. Dairy Res. 55, pp. 551-562, 1988.
B. Webb and G. E. Holm, "The Heat Coagulation of Milk" II. J. Dairy Science vol. 15, pp. 345-366, 1932.
E. Dickinson et al. "Adsorption at Interfaces in Dairy Systems" J. Society Dairy Technology, vol. 42, pp. 18-22, 1989.
E. Pagliaruni et al., "A Study on Optimizing Heat Treatment of Milk. II. Sterilization" Milchwissenschaft, vol. 43, pp. 720-722, 1988.
L. Chaplin and R. L. Lyster, "Effect of temperature on pH of Skim Milk" J. Dairy Science, vol. 55, pp. 277-280, 1988.
K. S. Mohammad and P. F. Fox, "Influence of Some Polyvolent Organic Acids & Salts on ... " J. Soc. Dairy Technol. vol. 36, pp. 112-117, 1983.
P. J. Fryer, "The Uses of Fouling Models in the Design of Food Process Plants" J. Soc. Dairy Technology, vol. 42, pp. 23-29, 1989.
J. Mottar & R. Moersmans, "Optimization of the Forewarming Process ... " J. Dairy Res., vol. 55, pp. 563-568, 1988.
A. S. Grandison, "Effects of Natural (or Seasonal) Variation in Concentration of ... " J. Soc. Dairy Technology, vol. 41, pp. 117-119, 1988.
Y. Pouliot et al., "An Experimental Technique for the Study of Milk Salt Balance", J. Dairy Science, vol. 72, pp. 36-40, 1989.
G. R. Patil & H. Reuter, "Deposit Formation in UHT Plants IV. Composition of Milk Deposits ... ", Milchwissenschaft, vol. 43, pp. 430-434, 1988.
T. van Kemenade, "Influence of Casein on Pecipitation of Calcium Phosphates", Netherlands Milk Dairy J., vol. 42, pp. 351-355, 1988.

Primary Examiner—Donald E. Ozaja
Assistant Examiner—Leslie Wong
Attorney, Agent, or Firm—Lonnie R. Drayer; Donald O. Nickey

[57] ABSTRACT

A process for aseptically processing a milk based infant formula includes the steps of adding citrate ions to the formula at a concentration of at least 128 ppm and adjusting the pH to be at least 6.8 before subjecting the formula to a temperature of at least 132° C.

8 Claims, 1 Drawing Sheet

ASEPTIC PROCESSING OF INFANT FORMULA

The present invention relates generally to a method of thermally sterilizing milk based infant formula and more specifically to a method of aseptically processing milk based infant formula in preparation for packaging the infant formula in sterilized containers.

BACKGROUND OF THE INVENTION

In the processing of nutritional products, generally there have been two approaches to packaging a nutritional product in a container. The first method utilizes retorting, whereby a nutritional product is placed in a container; the container is sealed; and then the product and container are subjected to heat, such that the product is sterilized. In the second method, hereinafter referred to an aseptic processing, a container is subjected to a sterilizing process prior to its receiving a sterilized nutritional product. An apparatus and method for sterilizing containers for aseptic processing is taught, for example, in U.S. Pat. No. 5,007,232.

A preferred aseptic processing system for nutritional products will operate continuously for sixteen hours (2 shifts) with eight hours (1 shift) for cleaning and sterilization. In order for an aseptic processing system to be cost effective the minimum run time acceptable is eight hours. When a milk based liquid nutritional product for infants was processed in a prototype aseptic processing system using a Ultra High Temperature Short Time (hereinafter refer to as "UHTST") treatment an almost immediate fouling (less than 30 minutes) of the hold tube occurred. This fouling problem was severe enough to require the UHTST unit to be shut down and cleaned before further processing could be attempted. As used herein and in the claims UHTST treatment means elevating the temperature of a liquid nutritional product to a temperature of at least 132° C. and holding the product at this high temperature for a time sufficient to commercially sterilize the product.

The major problems with fouling and "burn-on" in a UHTST system are: (a) that the fouling material acts as a barrier to heat transfer thereby reducing the effectiveness of the UHTST system; and (b) narrows the internal diameter of the hold tube, which increases the product velocity, thereby reducing the hold time sterilization. As the fouling material begins to inhibit the heating of the liquid nutritional product the system responds by increasing the steam pressure to compensate. This increase in steam pressure accelerates the rate of fouling and in a short time the system loses the capacity to maintain sterilization temperatures and hold times. Only by reducing or eliminating the amount of "burn-on" and fouling of a milk based liquid nutritional product can UHTST system operate effectively for an acceptable length of time.

It is clear that a need exists for a method of solving the problem of fouling or "burn-on" which occurs in a UHTST system when processing a milk based liquid nutritional product for infants.

DISCUSSION OF PRIOR ART

The mechanism by which deposits form in UHTST systems has not been conclusively identified at this time. There are a variety of theories, but one of the more widely accepted states that the rise in temperature during processing causes a reduction the solubility of the mineral salts (calcium-phosphate) resulting in supersaturation. The reduction in solubility favors the formation of crystal nuclei, and the growth of the nuclei into crystals which form the foundation of the deposit (Burton, "Previews of the Progress of Dairy Science, Section G. Deposits from Whole Milk in Heat Treatment Plant—A Review and Discussion", *Journal of Dairy Research*, 35:317-330 (1968).

Previous investigations have demonstrated that the amount of fouling during UHTST processing of milk could be drastically reduced by increasing the pH of the milk prior to forward flow (Skudder et al., "Effect of pH on the Formation of Deposit from Milk on Heated Surfaces during Ultra High Temperature Processing", *Journal of Diary Research*, 53:75-87, (1985)), Patil et al., "Deposit Formation in UHT Plants. III. Effect of pH of Milk in Directly and Indirectly Heated Plants", *Milchwissenschaft*. Vol. 43, No. 6, 360-362 (1988)). Several investigators have explored ways in which the formation of deposits in UHTST systems can be reduced. M. Burdett added various phosphates to milk before processing which reduced deposit formation by as much as 50% (Burdett, "The Effect of Phosphates in Lowering the Amount of Deposit Formation During the Heat Treatment of Milk", *Journal of Dairy Research*, 41: 123-129 (1974). The addition of Na phosphate, Na citrate, or k-carrageenan to milk prior to processing was shown to significantly reduce the weight of deposits (Joshi, et al., "Heat-induced Deposit Formation and its Relationship to Heat Stability in a Blend of Recombined and Fresh Milk", *Journal of Dairy Research*, 53: 323-328, (1986).

DETAILED DESCRIPTION OF THE INVENTION

Figure 1:
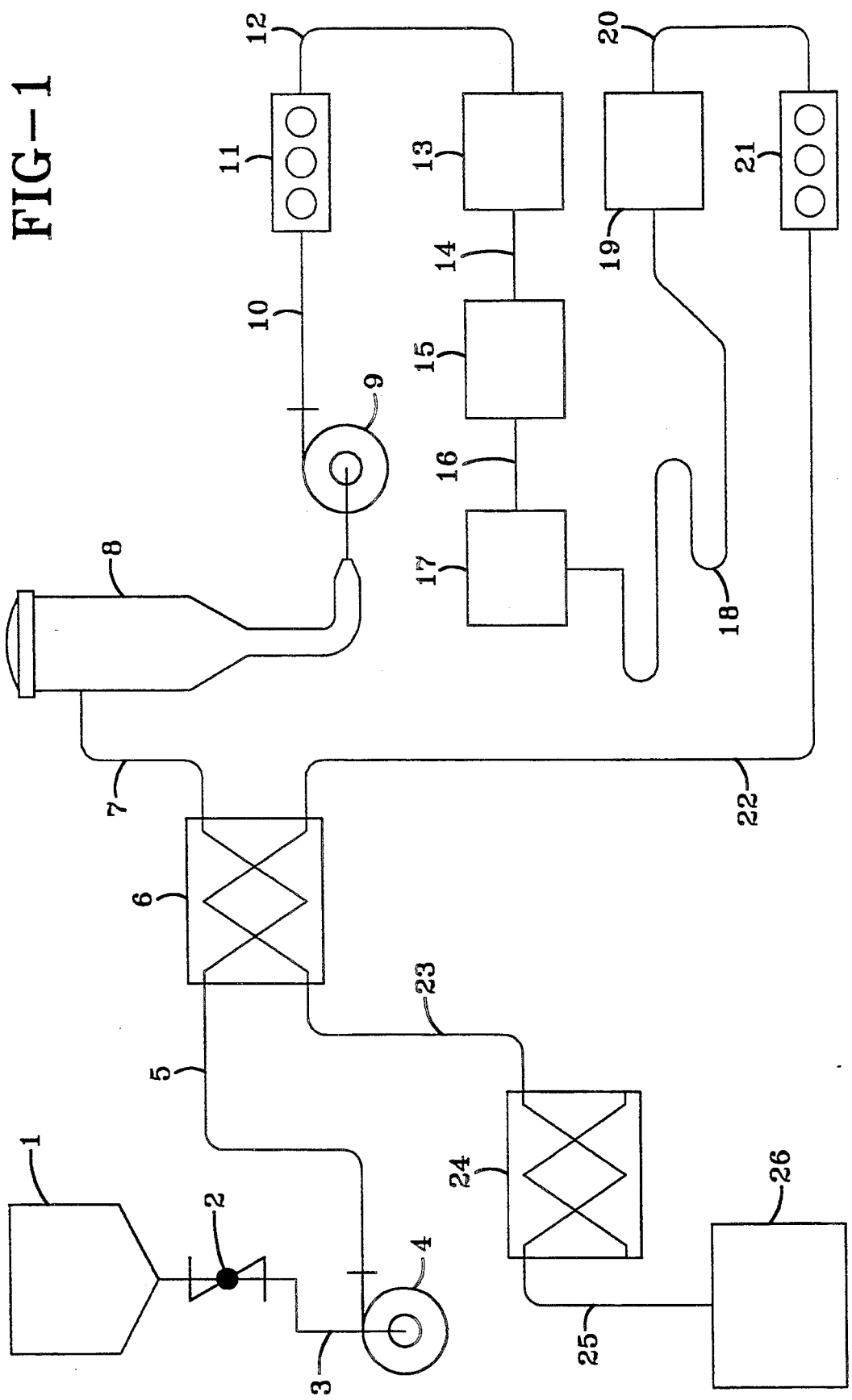
FIG. 1 is a schematic representation of a prototype system for processing milk based infant formula for aseptic packaging.

Referring first to FIG. 1, which is the sole drawing figure in this description, there is shown a very simple schematic representation of a prototype system for processing milk based infant formula for aseptic packaging which was used in the experiments which will be described herein. A supply of a milk based infant formula, for example a supply tank 1 is provided. The flow of infant formula is regulated by a valve 2, and passes through tubing 3 to a feed pump 4. The feed pump 4 propels the infant formula through tubing 5 towards a heat transfer device 6 in which the low temperature incoming infant formula passes through tubing which is adjacent to tubing containing high temperature outgoing infant formula, such that the temperature of the incoming infant formula is slightly elevated by transferred heat.

The infant formula then passes through more tubing 7 to a deaerator 8 which degasses the infant formula. Upon exiting the deaerator the infant formula is propelled by a second feed pump 9 through more tubing 10 to a homogenizer 11. Upon leaving the homogenizer the infant formula passes through more tubing 12 to a first heater 13 where the infant formula is heated, by indirect steam, to a temperature of, for example, about 77° C. Upon leaving the first heater the infant formula passes through more tubing 14 to a second heater 15 where the infant formula is further heated, by indirect steam, to a temperature of, for example, about 121° C. Upon leaving the second heater the infant formula passes through more tubing 16 to a third heater 17 where the infant formula is further heated, by indirect steam, to a temperature of, for example, about 143° C. It is to be understood that the system being described is only exemplary, and that one, two or any other suitable number of heaters may be employed, at any suitable temperatures for the infant formula, and that the heating source could be direct or indirect steam or even electric heating coils.

After exiting from the last heater, in this example the third heater 17, the infant formula passes through a hold tube 18 where the infant formula is held at an elevated temperature of, for example, about 143° C. for, for example, about five to ten seconds. It is in this hold tube 18 that the problem of fouling or "burn-on" was measured. After exiting from the hold tube the infant formula passes through a cooler 19 where the temperature of the infant formula is reduced to be, for example, about 77° C.

After exiting from the cooler 19 the infant formula passes through more tubing 20 to a second homogenizer 21. After exiting from the homogenizer the infant formula passes though more tubing 22 to the heat transfer device 6 which has already been described. However, this time the warmer infant formula will be considered to be the outgoing infant formula. After exiting from the heat transfer device 6 the infant formula passes through more tubing 23 to a plate cooler 24 where the temperature of the infant formula is reduced, for example, to about 20° C. After exiting from the plate cooler the infant formula passes through more tubing 25 to a filling apparatus 26 where the commercially sterile infant formula is placed into commercially sterile containers.

There are two types of fouling material that occur in UHTST systems. The first is a type A foulant. This material is a soft, voluminous, curd-like material. It does not adhere to the surface of the UHTST system very strongly and is easily removed by cleaning. The most significant problems with the type A material are its resistance to heat transfer and the reduction in cross-sectional area of the hold tube which reduces the time which the infant formula spends in the hold tube when the flow rate through the system remains constant. The second type of foulant is a type B material. This material is characterized by its gritty nature. It is composed mostly of minerals and is not a significant deterrent to heat transfer or hold tube performance.

When a milk based infant formula which was not in accordance with the present invention was processed in the prototype aseptic processing system significant fouling of the UHTST hold tube was observed. In the prototype aseptic processing system the fouling material was a typical type A material. The amount of fouling material in the hold tube is dependent upon the length of the run.

Steam control valves regulate the amount of steam entering the UHTST heaters (13, 15 and 17 in FIG. 1). The degree to which a steam control valve is open depends on how much steam and pressure is needed to maintain the heaters temperature setting. When the aseptic processing system is not fouled it maintains a constant valve setting. However, when the aseptic processing system begins to foul and the heat transfer properties deteriorate the aseptic processing system responds by opening the steam valves to maintain temperature. When processing a milk based infant formula in the exemplary aseptic processing system fouling can be determined by observing the steam control valve that regulates the third heater. The UHTST process is adversely affected by fouling that occurs in the hold tube. As fouling increases the degree of opening of the steam control valve increases. An increase of 25% over the initial set point was considered complete fouling for the purpose of the experiments described herein.

In the experiments described herein monitoring the system for fouling is simply a matter of observing the steam control valves during processing. The absolute amount of fouling was determined in these experiments by weighing the hold tube after processing. In each of the experiments described herein the milk based infant nutritional formula employed in the experiment was Similac ® Ready-to-Feed which is manufactured by the Ross Laboratories Division of Abbott Laboratories, Columbus, Ohio, United States of America.

The initial efforts to control fouling involved manipulating the steam temperature settings of the heaters. By lowering the temperature differentials between the heaters it was hoped that fouling could be avoided. This approach only marginally improved the length of each run, but it was not by itself enough of an improvement.

The next phase of the experiments evaluated the effects of increasing the pH and adding of citrate. Although simple adjustment of the pH of a milk based infant formula to a value of 7.0 further extended the run time, as shown in Table 1 the minimum length of run time of eight hours was not attained. The addition of potassium citrate in combination with a product pH of 6.9 to 7.1 was found to extend the run time to eight hours. Potassium citrate was added at levels of 400, 200, and 150 ppm, (citrate ion levels of 233, 116 and 87 ppm) as shown in Table 2. The amount of fouling material decreased with increasing levels of potassium citrate.

TABLE 1

Fouling of the UHTST System During Processing of A Milk Based Infant Formula After pH Adjustments

| Run No. | pH | Length of Run (min.) | Fouling Material (g) | Type of Foulant |
| --- | --- | --- | --- | --- |
| 1 | 7.00 | 240 | 25.1 | A |
| 2 | 7.02 | 85 | 48.6 | A |
| 3 | 7.00 | 75 | * | A |
| 4 | 7.01 | 75 | * | A |
| | | AVG.= 119 | AVG.= 36.85 | |

*Foulant material broke loose from hold tube during processing.

TABLE 2

Fouling of the UHTST System During Processing of A Milk Based Infant Formula After pH Adjustments and Potassium Citrate Additions

| Run No. | pH | ppm added citrate ions | Length of Run (min.) | Fouling Material (g) | Type of Foulant |
| --- | --- | --- | --- | --- | --- |
| 1 | 7.03 | 233 | 255* | 6.9 | B |
| 2 | 6.93 | 233 | 240* | 1.0 | B |
| 3 | 6.80 | 233 | 120* | 6.0 | B |
| 4 | 7.01 | 233 | 210* | 8.8 | B |
| 5 | 6.93 | 116 | 420* | 33.1 | A/B |
| 6 | 6.87 | 87 | 120** | 50.2 | A/B |

*Run terminated because no more product was available
**Run terminated due to fouling Experiments conducted with a prototype aseptic processing system determined that the highest level of potassium citrate (400 ppm) and the higher pHs' (6.9–7.0) produced the best results. When these fortification levels were used the amount of fouling was minimal, and only type B fouling occurred. The 0-time product quality of selected runs was acceptable.

Processed mix was obtained from a production facility and was processed in the prototype aseptic processing system with potassium citrate levels of 200, 300, and 400 ppm, (citrate ion levels of 116, 174, 233 ppm) at pHs' of 6.74 to 6.98. The potassium citrate used to fortify the milk based infant formula was weighed out, dissolved in water, and added slowly with agitation to the mix. After allowing the mix to agitate for 5 minutes 1.0N KOH was used to titrate the mix to the desired pH. The product was packaged in 8 oz metal cans and enrolled in a physical stability evaluation program.

The use of citrate, for example in the form of potassium citrate, to chelate the mineral salts and keep them soluble during UHTST processing of the milk based infant formula has been explored and found to be very effective. The most effective potassium citrate level was found to be a fortification rate of 400 ppm. The optimum pH was found to be between 6.9 and 7.0. The amount of fouling material decreased, and the type of foulant changed from A to B as the potassium citrate level and the pH were increased (Table 3). A visual examination of the hold tube from the UHTST system in the prototype aseptic processing system demonstrated the same relationship.

TABLE 3

Fouling of the Prototype UHTST System During Processing of A Milk Based Infant Formula After pH Adjustments and Potassium Citrate Additions

| Run No. | Raw Product Batch | pH | ppm added citrate ions | Length of Run (min.) | Fouling Material (g) | Type of Foulant |
| --- | --- | --- | --- | --- | --- | --- |
| 1 | 1 | 7.01 | 233 | 120 | 6.1* | B |
| 2 | 1 | 7.03 | 174 | 120 | 0.6 | B |
| 3 | 1 | 7.02 | 116 | 120 | 1.1 | B |
| 4 | 1 | 6.80 | 233 | 55 | 74.5 | A |
| 5 | 1 | 6.90 | 233 | 55** | 2.9 | B |
| 6 | 2 | 6.90 | 233 | 112 | 3.7 | B |
| 7 | 2 | 6.90 | 174 | 120 | 6.5 | B |
| 8 | 2 | 6.90 | 116 | 120 | 31.1 | A/B |
| 9 | 2 | 6.80 | 233 | 75 | 5.4 | B |
| 10 | 2 | 6.80 | 174 | 92 | 69.5 | A |
| 11 | 2 | 6.85 | 174 | 115 | 14.9 | A/B |
| 12 | 3 | 6.71# | 174 | 15 | 67.0 | A |
| 13 | 3 | 6.85 | 174 | 120 | 12.4 | A/B |
| 14 | 3 | 6.90 | 116 | 120 | 13.4 | A |
| 15 | 3 | 6.80 | 233 | 115 | 4.4 | B |
| 16 | 3 | 6.85 | 174 | 110 | 5.2 | B |

*UHTST system was rinsed with caustic before product run
**Run terminated because no more product was available
pH after potassium citrate addition, no pH adjustment The UHTST processed product is much whiter than the retorted product, and has more of a true milk color. This aspect of the aseptically processed product may be very beneficial if the product is packaged in a translucent container. The physical stability of product from this experiment was checked again during an eighteen month period, and it continued to be satisfactory.

It was thought that the seasonal variation associated with the condensed skim milk in a milk based infant formula might affect the process of the invention. Portions of commercial batches of a milk based infant formula were obtained from a production facility at monthly intervals from January through September. The batches were reprocessed in the prototype aseptic processing system. Optimization batches processed under the same conditions were filled from October through December. The results revealed that hold tube fouling was effectively controlled in all batches. No fouling was recorded during any of the approximately 2 hour long runs.

The use of 400 ppm of potassium citrate (233 ppm of citrate ions) and a pH adjustment to 6.95±0.05 to control fouling during UHTST processing appears to be unaffected by seasonal variations associated with milk based products. The replicate batches were processed for two hours with no fouling of the hold tube. The physical stability of the replicate and optimization batches was good. The physical stability results of the replicate batches were in agreement with the results from the optimization batches. The addition of potassium citrate results in potassium levels of approximately 955 mg/liter and citrate levels of approximately 948 mg/liter. The potassium level is well below the United States Infant Formula Act (IFA) maximum. The control of fouling during aseptic processing of a milk based infant formula can be achieved with the addition of 233 ppm of citrate ions (400 ppm potassium citrate) and a pH adjustment to 6.95±0.05.

We claim:

1. A process for aseptically processing a milk based infant formula comprising the steps of:
    (a) providing a milk based infant formula and a sterilized container;
    (b) adding citrate ions to the infant formula at a concentration of at least 128 ppm and thereafter adjusting the pH of the infant formula to be at least 6.8;
    (c) heating the infant formula to a temperature of at least 132° C. and holding the infant formula at said temperature for a time sufficient to commercially sterilize the infant formula while the infant formula is passing through a tube; and
    (d) placing said sterilized formula in said sterilized containing and sealing said container.

2. A process for aseptically processing a milk based infant formula according to claim 1 wherein in step (b) the concentration of added citrate ions is in the range of about 128 to 233 ppm and the pH of the infant formula is adjusted to be in the range of about 6.8 to 7.1.

3. A process for aseptically processing a milk based infant formula according to claim 1 wherein in step (b) the citrate ions are added in the form of potassium citrate.

4. A process for aseptically processing a milk based infant formula according to claim 2 wherein in step (b) the citrate ions are added in the form of potassium citrate.

5. A process for aseptically processing a milk based infant formula according to claim 1 wherein in step (b) the pH of the infant formula is adjusted by adding potassium hydroxide thereto.

6. A process for aseptically processing a milk based infant formula according to claim 2 wherein in step (b) the pH of the infant formula is adjusted by adding potassium hydroxide thereto.

7. A process for aseptically processing a milk based infant formula according to claim 3 wherein in step (b) the pH of the infant formula is adjusted by adding potassium hydroxide thereto.

8. A process for aseptically processing a milk based infant formula according to claim 4 wherein in step (b) the pH of the infant formula is adjusted by adding potassium hydroxide thereto.

* * * * *